Dec. 3, 1935.  J. G. PEPPARD, JR  2,022,779
SEED HARVESTING MACHINE
Filed Sept. 27, 1934
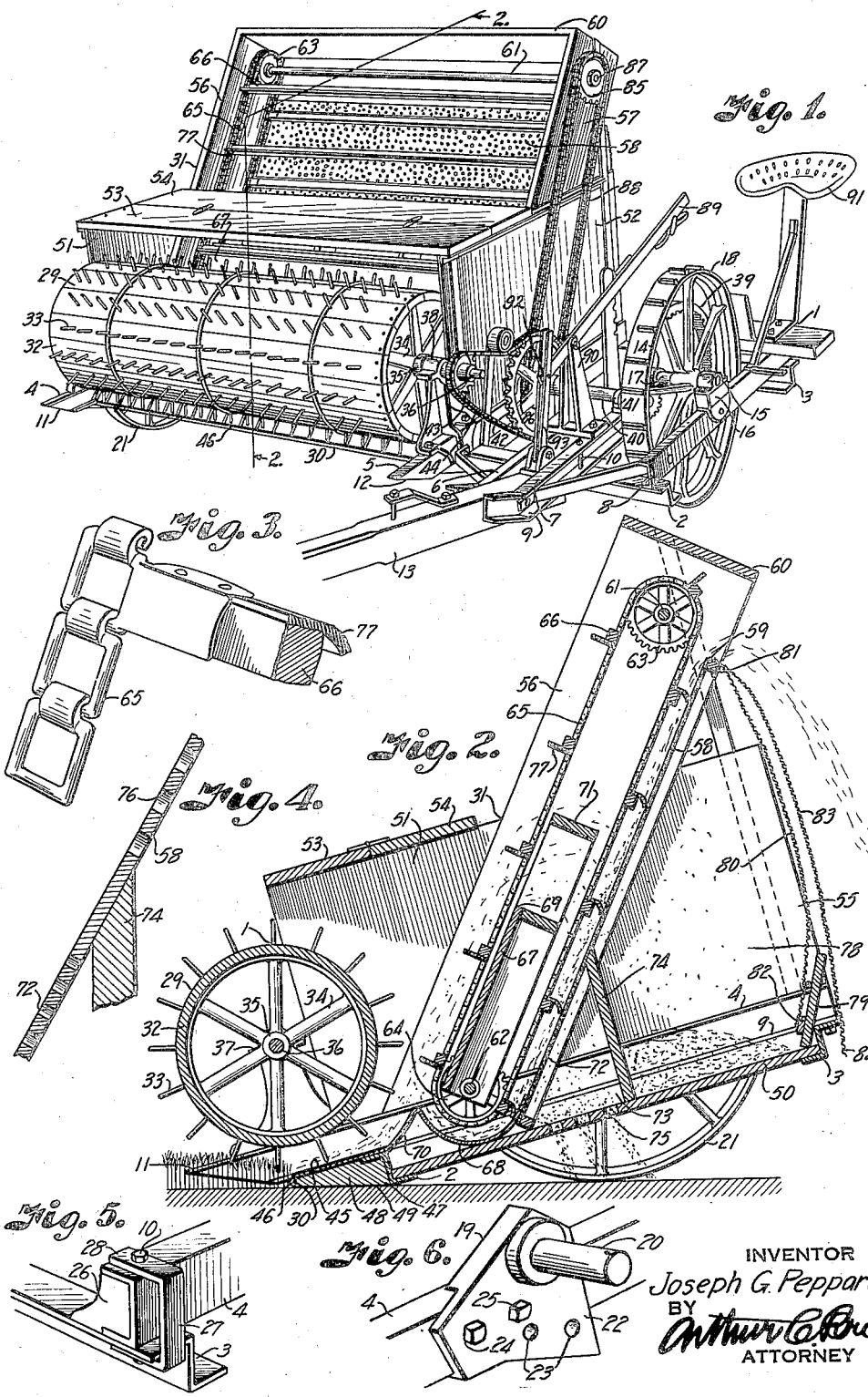
INVENTOR
Joseph G. Peppard Jr.
BY
Arthur C. Brown
ATTORNEY Patented Dec. 3, 1935

2,022,779

UNITED STATES PATENT OFFICE 2,022,779

SEED HARVESTING MACHINE

Joseph G. Peppard, Jr., Kansas City, Mo., assignor to Peppard Seed Company, Kansas City, Mo., a corporation of Missouri Application September 27, 1934, Serial No. 745,715

13 Claims. (Cl. 56—126)

This invention relates to seed harvesting machines and more particularly to those of the stripper type, and has for its principal object to provide for harvesting Lespedeza and similar seed crops which grow in close proximity to the ground.

Other important objects of the invention are to provide a strong, rigid machine construction that is of light weight and draft, and that can be readily adjusted to the height of the crop, and to provide for initial separation of the seed from dirt, chaff, plant foliage and other foreign matter.

In accomplishing these and other objects of the invention, as hereinafter pointed out, I have provided improved details of structure, the preferred form of which, is illustrated in the accompanying drawing, wherein:

Fig. 1 is a perspective view of a harvesting machine particularly adapted for harvesting Lespedeza seed, and embodying the improvements of the present invention.

Fig. 2 is a longitudinal vertical section through the machine on the line 2—2, Fig. 1.

Fig. 3 is a perspective view of a portion of one of the conveyor slats and one of its operating chains.

Fig. 4 is a section through the lower end of the riddle screen particularly illustrating the relative sizes of screen apertures through which the dirt and seed are respectively discharged.

Fig. 5 is a detail perspective view particularly illustrating the method of reinforcing the outer rear corner of the frame.

Fig. 6 is a detail perspective view of the bracket carrying the outer wheel.

Referring more in detail to the drawing:

I designates the main frame of the machine which includes transverse front and rear Z bars 2 and 3 arranged so that their upper flanges extend outwardly to support longitudinal frame members 4, 5, 6, 7 and 8. The longitudinal frame members are preferably of channel shape and have their lower flanges 9 resting on and secured to the upper flanges of the Z bars by suitable fastening means such as bolts 10. The longitudinal members 4 and 5 are spaced apart a distance equal to the width of the swath to be stripped and have beveled forward ends projecting beyond the front Z bar to form dividing means 11 and 12 at the sides of the swath. The next adjacent members 6 and 7 also project forwardly of the frame and are curved upwardly at their ends to pivotally mount a draft tongue 13 therebetween by which the machine is drawn over a field of Lespedeza or similar crop. The longitudinal members 7 and 8 mount axle bearings 14 and 15 which are spaced therefrom by spacing blocks 16. Mounted in the bearings is an axle shaft 17 carrying a main wheel 18. The longitudinal member 4 at the opposite side of the frame carries a wheel bracket 19 having an axle 20 rotatably mounting a wheel 21. The wheel 21 cooperates with the main wheel in pivotally supporting the frame in such a manner that the front of the frame can be moved into close proximity to the ground as later described.

The wheel bracket includes a plate portion 22 having pairs of openings 23 and 24 differentially spaced from the axis of the axle for selectively attaching the plate to the channel 4 by bolts 25 adapted to extend through either of the pairs of openings and through a corresponding pair of openings in the channel.

In order to raise the pivotal axis of the frame in compensating for different height crops, the spacing block 16 may be removed and the bearings 14 and 15 attached directly to the channels 7 and 8. The opposite side of the frame is correspondingly raised by removing the bolts 25 from the openings 24 and reinserting them so that they pass through the pair of openings 23 as shown in Fig. 6. When the wheel bracket is thus adjusted, the axis of the axle 20 realigns with the adjusted position of the axle shaft 17 so that the frame again pivots in a horizontal plane, but at a higher level.

Owing to the fact that the wheel bracket 22 is attached to and carried solely by the channel 4, there is a tendency for the channel to tip or twist on the Z bars. To overcome this tendency, a filler block 26 is inserted between the flanges thereof at the Z bar 3 and a U shaped brace 27 having legs 28 is positioned so that the ends of the legs overlap respectively the upper flange of the channel 4 and the under face of the outwardly projecting flange of the Z bar. The bolt 10 is then inserted through the legs of the brace and through corresponding openings in the flanges and filler block, as shown in Fig. 5.

The filler block thus prevents twisting of the channel in one direction, while the brace member prevents twisting in the opposite direction to thereby substantially stiffen the mounting of the wheel and enhance the rigidity of the frame. The seed harvesting mechanism is mounted directly on the channels 4 and 5 and includes a stripping cylinder 29, a stripping bar 30 and a separating mechanism mounted in a housing 31 at the rear of the cylinder, as now to be described. The cylinder 29 includes a drum 32 having a plurality of rows of radial teeth 33 projecting from the periphery thereof as shown in Fig. 1. The cylinder also includes spokes 34 connecting the drum thereof with axial hubs 35 that mount a horizontal shaft 36 having its ends rotatably mounted in bearings 37 and 38 fixed to the forward projecting ends of the longitudinal frame members 4 and 5. The teeth 33 are preferably of flexible nature in order to prevent breaking or bending thereof in case they should strike an obstruction in the field. Flexibility of the teeth also promotes a whip like action in helping to extract the seed. In order to rotate the cylinder the main wheel carries a ring gear 39 which drives a pinion gear that is fixed to a jack shaft 40, the jack shaft being mounted in bearings 41 fixed to the longitudinal frame members 5 and 7 respectively as shown in Fig. 1. To complete the drive, the jack shaft carries a sprocket wheel 42 driving an aligning sprocket 43 on the outer projecting end of the cylinder shaft 36 by means of a chain 44 operating over the respective sprockets.

The stripping bar 30 includes a plate 45 having its rear edge attached to the forwardly projecting flange of the Z bar 2 and its forward edge projecting substantially to a vertical plane passing through the axis of the cylinder and in close proximity to the ends of the cylinder teeth 33.

The forward edge of the plate is bent retractively as at 46 to form a round nose for a sled like shoe 47 and to prevent cutting off of the Lespedeza plants as the machine is drawn across the field.

The sled like shoe preferably includes a triangular shaped strip 48 filling the angle between the stripper bar 45 and the web of the Z bar 2 and having a flat under surface 49 to engage the ground, as shown in Fig. 2.

The stripping structure thus described is particularly adapted to harvesting seed of Lespedeza and similar plants where the seed formation is low on the plant, for the reason that the stripping bar and cylinder are mounted to move closely over the ground and it is, therefore, possible to harvest substantially all of the seed on the plants.

After the seed has been stripped from the plants, the seed along with plant foliage and foreign matter is discharged through centrifugal force generated by the rotating cylinder into the separating housing 31, now to be described. The housing includes a floor 50 that is supported on the inturned flanges of the Z bars 2 and 3 and side walls 51 and 52 which project upwardly from the longitudinal frame members to a point above the stripping cylinder. The front upper half of the box shaped housing formed by the floor and side walls is closed by cross board 53 having its ends resting on and fixed to the upper edges of the side walls and to which is hinged a door 54 through which access is had to the separating mechanism. The rear side of the housing is left open to provide an opening 55 through which the seed is removed as later described.

Mounted within the housing between upwardly and rearwardly inclined side boards 56 and 57 is a similarly inclined riddle screen 58 that is supported on a frame 59. The side boards are connected at their upper ends by a board 60, as shown. Rotatably mounted in the respective ends of the side boards are upper and lower conveyor shafts 61 and 62 carrying pairs of sprockets 63 and 64 that are mounted thereon in close relation with the inner faces of the boards 56 and 57. Operating over aligning sprockets of the pairs are chains 65 carrying slats 66 that move upwardly over the upper surface of the riddle screen on the lower run of the chains and downwardly in spaced relation with the screen on the upper run of the chains.

Carried within the housing between the run of the chains is an inclined baffle 67 that extends completely across the width thereof and has its lower end spaced from the bottom of a trough member 68 in which the lower sprockets 64 operate, while the upper edge 69 of the baffle terminates in substantial alignment with the top of the cylinder as shown. The trough member 68 has its front edge connected with the stripper plate 30 by an upwardly curved plate portion 70 so that the Lespedeza discharged by the cylinder is deflected upwardly thereby onto the inclined baffle 67 and away from the trough. The Lespedeza upon striking the baffle is engaged by the conveyor slats and carried thereby back toward the trough to be carried upwardly across the riddle screen.

This material includes most of the seed, dirt and the heavier parts of the foliage being more easily blown by the centrifugal force and blasting effect generated by the rotating toothed cylinder 29. The lighter foliage will be cast across the top of the baffle but will be deflected downwardly toward the lower run of the riddle screen upon striking a cross bar 71 which cooperates with the cover 53—54 to substantially close the top of the separating housing 31. Due to the fact that the machine must move in close relation to the ground, a large percent of the foreign matter is dirt, which, unless it is initially separated from the Lespedeza interferes with separation of the seed from the foliage matter. I therefore provide the lower end of the riddle screen with a set of fine apertures 72 which are small enough to prevent passage therethrough of the Lespedeza seed, but which are of such size as to freely pass the dirt. Upon dropping through the apertures, the dirt is collected in a compartment 73 which is formed by a partition 74 extending across the housing between the floor and riddle screen 58, as shown in Fig. 2. The dirt is sifted from the compartment during movement of the machine through openings 75 extending through the floor 50.

The Lespedeza seed and foliage matter being then comparatively free of the dirt, are carried over the upper portion of the riddle screen which is provided with apertures 76 large enough to pass the seed, but of such a size as to exclude most of the foliage.

In order to assist in passage of the seed through the apertures of the riddle screen, the conveyor slats are provided with flexible strips 77 which move in wiping contact with the riddle screen surface to press the seeds through the apertures 76.

The seed, upon passing through the riddle screen is collected in a seed compartment 78 formed in the housing between the partition and a rearwardly inclined end board 79 located at the bottom of the opening 55. The opening 55 to the seed compartment is normally closed by a drop curtain 80 tacked across the bar 81 at the rear edge of the riddle screen support 59 and which has its lower end extending downwardly on the inner side of the end board, the lower end being preferably weighted by a cross bar or the like 82 to hold the screen in position. To assure that the waste foliage discharged off the riddle screen is kept from falling into the seed compartment, I provide a second drop curtain having its lower end 84 suspended on the outer side of the end board 79 as shown to prevent material from dropping between the inner curtain and the board 79.

In order to drive the conveyor, the jack shaft 40 carries a sprocket 86 aligning with a similar sprocket 85 on the projecting end 87 of the upper conveyor shaft 61 and operating over the sprockets is a drive chain 88.

The cylinder may be moved to and from the ground by tipping the frame 1 on the axis of the wheels 18 and 21 as pointed out by means of a lever 89 which is fulcrumed on the frame by means of a bracket 90 and which has the operating end thereof projecting toward an operator's seat 91 located in the rear of the main wheel 18. The forward end 92 of the lever connects with suitable linkage 93 with the tongue 13. Thus, by depressing the operating end of the lever 89, the front of the frame is lowered and by raising the lever, the frame is correspondingly raised.

In operating a machine constructed and assembled as described, a suitable draft is applied to the tongue 13 that hauls the machine over a field of Lespedeza or other crop. The operating lever 89 is then adjusted so that the shoe 47 rides in close proximity to the ground as shown in Fig. 2. Upon forward movement of the machine, the main wheel 18 operates the jack shaft 40 through the ring and pinion gears 39. Rotation of the jack shaft effects rotation of the cylinder 29 in an anti-clockwise direction, Fig. 2, through the sprocket and chain drive from the jack shaft 40. The conveyor is also operated to move over the riddle screen by means of the chain 88 and sprockets 85 and 86.

As the machine is moved along the ground, teeth 33 engage the Lespedeza plants to draw them toward the stripping bar causing the seeds to be stripped from the plants and discharged under the centrifugal force generated by the cylinder onto the baffle 67. During stripping of the seed and due to the fact that the machine is moved in close relation to the ground, much dirt and foliage is discharged with the seed; however, the dirt is readily removed as soon as the slats carry the material over the fine apertures 72 of the screen, the dirt falling through the apertures into the compartment 73.

The Lespedeza, being relieved of the dirt, continues on up the riddle screen to drop through the larger openings 76 under pressure of the wiping strips 77. The larger foliage and sticks being unable to pass under the openings, are carried by the wiping strips off the upper end of the riddle for discharge over the drop curtains 80 and 83.

Some of the small parts of the foliage will, of course, drop into the seed collecting compartment along with the seed; however, this does not seriously contaminate the seed, since it is readily removed in subsequent cleaning at a central plant.

When the seed compartment has been filled substantially to the level of the end board 79, the curtains are drawn back over the board 60 and the seed is removed through the opening 55.

Attention is particularly directed to the reverse movement of the stripped materials by the slats of the conveyor. This is an important feature of the present invention as it aids the initial separation of the dirt from the foliage and seeds as they are carried over the riddle screen. The dirt upon collecting in the compartment 73 gradually sifts through the openings in the floor 50 for return to the field.

From the foregoing, it is apparent that I have provided a machine which is readily adapted to harvesting Lespedeza seed and which effectively removes the dirt and majority of foreign matter therefrom.

What I claim and desire to secure by Letters Patent is:

1. A harvester for seed crops of the character described including a mobile support, a separator housing carried by the support, a stripper bar carried in front of the separator housing, a stripping cylinder having a shaft, bearings mounted on the mobile support and engaging the shaft for rotatably supporting the stripping cylinder in cooperative relation with the stripping bar for stripping and discharging seed into the separator housing, an upwardly inclined riddle screen supported in the housing for separating the seed from foreign material, a slat conveyor mounted on the mobile support for moving the seed over the riddle screen, and flexible strips on the slats of the conveyor for pressing the seed through the riddle screen.

2. A harvester for seed crops of the character described including a mobile support, a separator housing carried by the support, a stripper bar carried in front of the separator housing, a stripping cylinder, means mounted on the mobile support for rotatably mounting the stripping cylinder in cooperative relation with the stripping bar for stripping and discharging seed into the separator housing, a riddle screen in the separator housing having groups of apertures of differential size at opposite ends thereof for selectively passing seed and foreign matter deposited thereon by the stripping cylinder, and a conveyor mounted on the support for moving the seed successively over said groups of apertures for selectively separating the seed from foreign matter.

3. A harvester for seed crops of the character described including a mobile support, a separator housing carried by the support, a stripper bar carried in front of the separator housing, a stripping cylinder, means mounted on the mobile support for rotatably supporting the stripping cylinder in cooperative relation with the stripping bar for stripping and discharging seed into the separator housing, an upwardly inclined riddle screen supported in the housing and having upper and lower groups of apertures for separating foreign material and seed from plant foliage removed by the stripping cylinder, a conveyor mounted on the mobile support for moving the seed over the riddle screen, and a partition extending across the housing below the riddle screen and between the groups of apertures for dividing the housing into chambers to receive the foreign material and seed respectively.

4. A harvester for seed crops of the character described including a mobile support, a separator housing carried by the support, a stripper bar carried in front of the separator housing, a stripping cylinder, means mounted on the mobile support for rotatably supporting the stripping cylinder in cooperative relation with the stripping bar for stripping and discharging seed into the separator housing, an upwardly inclined riddle screen supported in the housing and having upper and lower groups of apertures of differential size for separating the seed and foreign material from plant foliage removed by the stripping cylinder, a slat conveyor mounted on the support for moving the seed over the riddle screen, and flexible strips on the slats of the conveyor for pressing the seed and foreign material through the respective apertures.

5. A harvester for seed crops of the character described including a mobile support, a separator housing carried by the support, a stripper bar in front of the separator housing, a stripping cylinder, means mounted on the support for rotatably mounting the stripping cylinder in cooperative relation with the stripping bar for stripping and discharging seed into the separator housing, a riddle screen in the housing for separating seed from foreign material, a slat conveyor mounted on the support having a lower run operating over the riddle screen to move the seed through the apertures of the screen and to carry plant foliage from the separator housing and having an upper run moving in spaced relation to the riddle screen, and a baffle supported under the upper run of the conveyor for retaining the seed and plant foliage discharged from the stripping cylinder for movement by the conveyor across said riddle screen.

6. A harvester for seed crops of the character described including a mobile support, a separator housing carried by the support and having open front and rear sides, a stripper bar carried below the open front side of the housing, a stripping cylinder, means mounted on the support for rotatably mounting the stripping cylinder in the front opening in cooperative relation with the stripping bar for stripping and discharging seed into the separator housing, an upwardly and rearwardly inclined riddle screen in the housing for separating seed from the foreign material, a conveyor mounted on the support for moving the seed over the riddle screen, and a drop curtain depending below the rear edge of the riddle screen for closing the rear opening of the housing.

7. A harvester for seed crops of the character described including a mobile support, a separator housing carried by the support and having open front and rear sides, a stripper bar carried below the open front side of the housing, a stripping cylinder, means mounted on the support for rotatably mounting the stripping cylinder in the front opening in cooperative relation with the stripping bar for stripping and discharging seed into the separator housing, an upwardly and rearwardly inclined riddle screen in the housing for separating seed from the foreign material, a conveyor mounted on the support for moving the seed over the riddle screen, an end board at the bottom of the rear opening, a curtain depending below the rear edge of the riddle screen for closing the rear opening of the housing and having its lower end located at the inner side of said end board, and a second drop curtain overlapping the outer side of the end board.

8. A harvester for seed crops including a mobile support, a separator housing carried by the support and having outlet openings in the bottom thereof, a stripper bar in front of the separator housing, a stripping cylinder, means mounted on the support for rotatably mounting the stripping cylinder in cooperative relation with the stripping bar for stripping and discharging seed into the separator housing, an inclined riddle screen in the housing having a group of apertures of smaller size than the seed and located in line with the opening of the housing for removing dirt from the seeds and having a second group of openings to pass the seed, a slat conveyor mounted on the support having a lower run operating over the riddle screen to move the dirt and seed through the respective apertures of the screen and to carry plant foliage from the separator housing and having an upper run moving in spaced relation to the riddle screen, and a baffle supported under the upper run of the conveyor for retaining the seed discharged from the stripping cylinder for movement by the conveyor across said riddle screen.

9. A harvester for seed crops including a mobile support, a separator housing carried by the support and having open front and rear sides, seed stripping means mounted in the open front of the housing for stripping and discharging seed into the separator housing, an upwardly and rearwardly inclined riddle screen in the housing for separating seed from the foreign material, a conveyor mounted on the support and braced by the separator housing for moving the seed over the riddle screen, and a curtain supported by and depending below the upper end of the riddle screen for closing the rear opening of the housing.

10. A harvester for seed crops of the character described including a mobile support, a separator housing carried by the support, a stripper bar carried in front of the separator housing, a cylinder having flexible teeth, means mounted on the support for rotatably mounting the cylinder in cooperating relation with the stripping bar for stripping and discharging seed into the separator housing, an upwardly inclined riddle screen in the housing, and an endless conveyor mounted on the support within the housing in substantial alignment with the riddle screen and movable downwardly in a direction opposite to rotation of the cylinder for reversing movement of the seed discharged from the teeth of the cylinder and then upwardly for moving the seed over the screen.

11. A harvester for seed crops of the character described including a mobile support, a separator housing carried by the support, a stripper bar carried in front of the separator housing, a stripping cylinder, means mounted on the support for rotatably supporting the stripping cylinder in cooperative relation with the stripping bar for stripping and discharging seed into the separator housing, an upwardly inclined riddle screen supported in the housing and having upper and lower groups of apertures of different size for separating the seed and foreign material from plant foliage removed by the stripping cylinder, and a conveyor mounted on the support and having flexible wiping strips for moving the seed over the riddle screen and passing the seed and foreign material through the respective groups of apertures.

12. A harvester for seed crops of the character described including a mobile support, a separator housing carried by the support, a stripper bar in front of the separator housing, a stripping cylinder, means mounted on the support for rotatably mounting the stripping cylinder in cooperative relation with the stripping bar for stripping and discharging seed into the separator housing, a riddle screen in the housing for separating seed from foreign material, a slat conveyor mounted on the support having a lower run operating over the riddle screen to move the seed through the apertures of the screen and to carry plant foliage from the separator housing and having an upper run moving in spaced relation to the riddle screen, a baffle supported under the upper run of the conveyor for retaining the seed and plant foliage discharged from the stripping cylinder for movement by the conveyor across said riddle screen, and a cross bar above the baffle and supported between the runs of the conveyor for deflecting foliage downwardly from the cross bar which has been cast over the baffle by the rotating action of the stripping cylinder.

13. A harvester for seed crops including a mobile support, a separator housing on the support, a stripping cylinder carried on the support for stripping and centrifugally discharging the seed material into the separator housing, a screen supported in the separator housing, a slatted conveyor mounted on the support within the housing having an upper run operating against the discharge of said seed material to effect threshing of the seed, and having a lower run operating over said screen to effect final separation of the seed from the waste material, and a concave member located ahead of the screen to cooperate with the slats on the conveyor to effect additional threshing of the seed.

JOSEPH G. PEPPARD, Jr.